Figure 1:
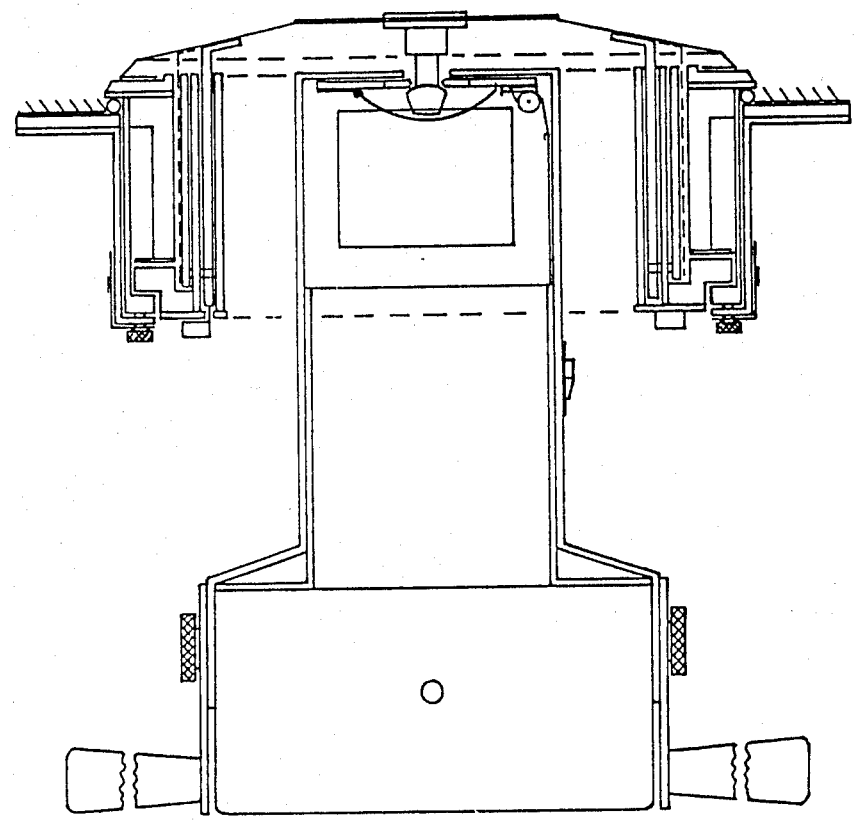

United States Patent [19]

Urquhart

[11] Patent Number: 4,514,068
[45] Date of Patent: Apr. 30, 1985

[54] CAMERA MOUNTING SYSTEM

[76] Inventor: Kevin G. Urquhart, 22 Flood St., Barraba, New South Wales, 2347, Australia

[21] Appl. No.: 520,814

[22] Filed: Aug. 5, 1983

[30] Foreign Application Priority Data

Aug. 18, 1982 [AU] Australia .................... PF5447

[51] Int. Cl.³ .................... G03B 17/56; G03B 29/00
[52] U.S. Cl. .................... 354/293; 352/132; 358/108; 358/229
[58] Field of Search .......... 354/74, 81, 293, 95; 352/132; 358/108, 109, 229

[56] References Cited

U.S. PATENT DOCUMENTS

| 3,118,340 | 1/1964 | Iwerks | 352/132 X |
| 3,868,706 | 2/1975 | Steingold | 354/95 |
| 3,889,052 | 6/1975 | Back | 358/108 |
| 4,063,258 | 12/1977 | Allen | 354/81 |

FOREIGN PATENT DOCUMENTS 752658 9/1933 France ..................... 352/132

Primary Examiner—John Gonzales
Attorney, Agent, or Firm—Ladas & Parry

[57] ABSTRACT

A camera mounting system which allows photographs to be taken from inside a surveillance or observation vehicle, with unlimited horizontal camera traverse, and an improved field of view. The mounting system comprises an assembly which fits into a hole in the roof of a vehicle or the like, and has a telescoping cap portion which, when in its retracted position, covers the hole, and also extends outwardly from the roof. A camera mounting bracket is releasably attached to the cap portion and has a mirror angled to reflect light from outside the vehicle to a camera mounted on the bracket. The bracket is rotatable within the hole.

10 Claims, 14 Drawing Figures

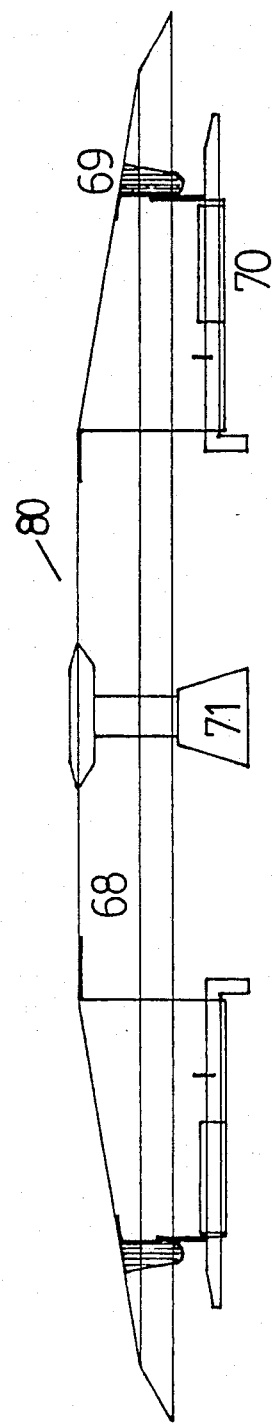
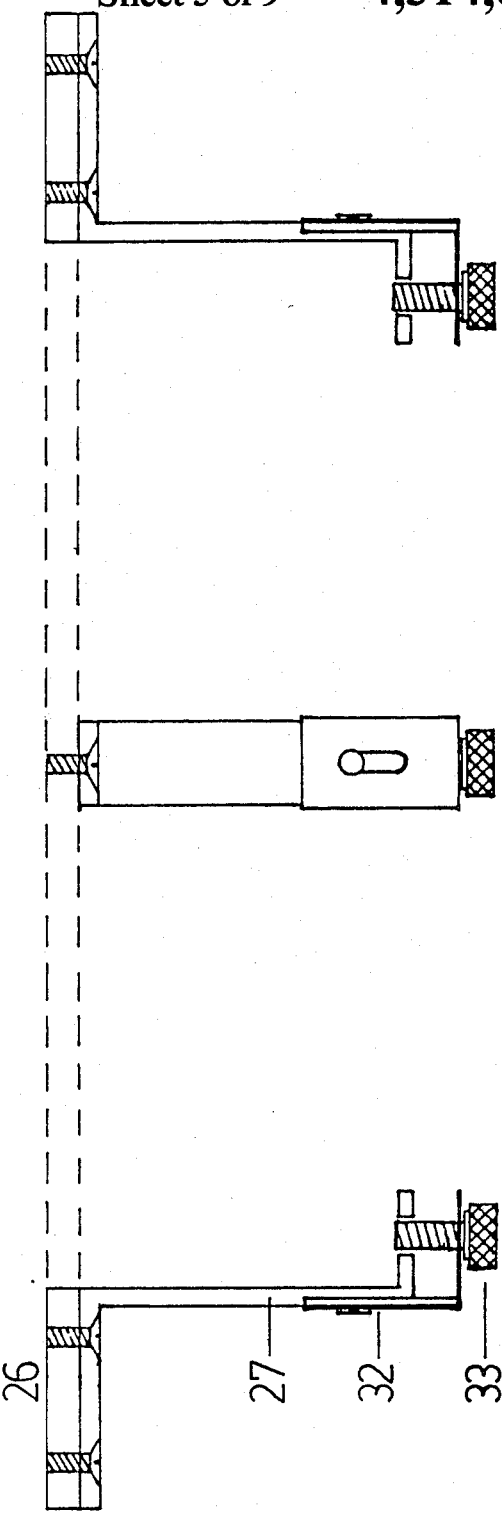

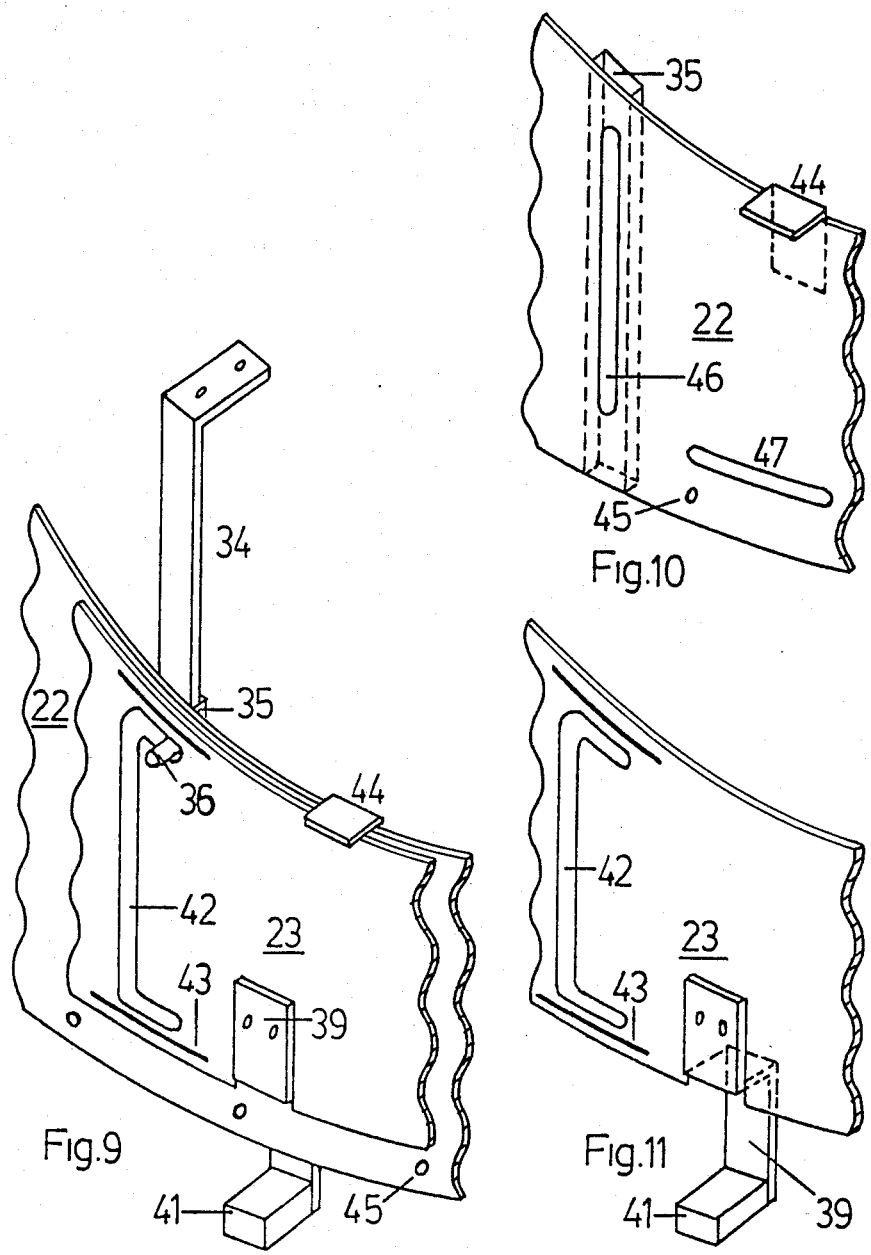

CAMERA MOUNTING SYSTEM

The present invention relates to an improved method of taking photographs from inside a surveillance or observation vehicle, and is directed to a camera mounting system for carrying out this method.

It has been found in practice that the taking of surveillance photographs from inside a vehicle has been limited, in most cases, to the number of available windows in the vehicle. This method restricts the camera operator's field of view, and more importantly, the camera angle and camera angle traverse. Similarly, "periscope" type arrangements suffer from restricted fields of view.

It is an object of the present invention to overcome, or substantially ameliorate, the abovedescribed disadvantages of the prior art by providing a camera mounting system which allows a greater field of view to be obtained.

According to one aspect of the present invention there is disclosed a camera mounting system comprising frame support means adapted to be affixed adjacent an opening in the roof of a vehicle or the like; a mounting assembly receivable in said opening and supported by said frame support means, said assembly having a telescoping cap portion extendable from a retracted position wherein the cap portion covers said opening to an extended position outwardly of said opening; a camera mount bracket releasably attachable to said cap portion from within said mounting assembly, said camera mount bracket comprising a mirror adjusted to reflect light from outside said opening to a camera positioned inside on said camera mount bracket, said camera mount bracket being rotatable within said opening.

Typically, the mounting assembly is a cylindrical dome unit. The camera mounting system of the present invention is suitable for mounting in the roof of a surveillance or observation vehicle, and enables the camera operator to take photographs from inside the vehicle with unlimited horizontal camera traverse, up and down angles of view, and a much improved photographic field of view. The invention gives the camera operator complete seclusion from his immediate environs. The camera mounting bracket can be equipped with still camera, movie camera, video recording equipment or combination of these. Camera mounting brackets for different equipment types can be interchanged in a matter of seconds, which is often essential to capture events on film.

Figure 2:
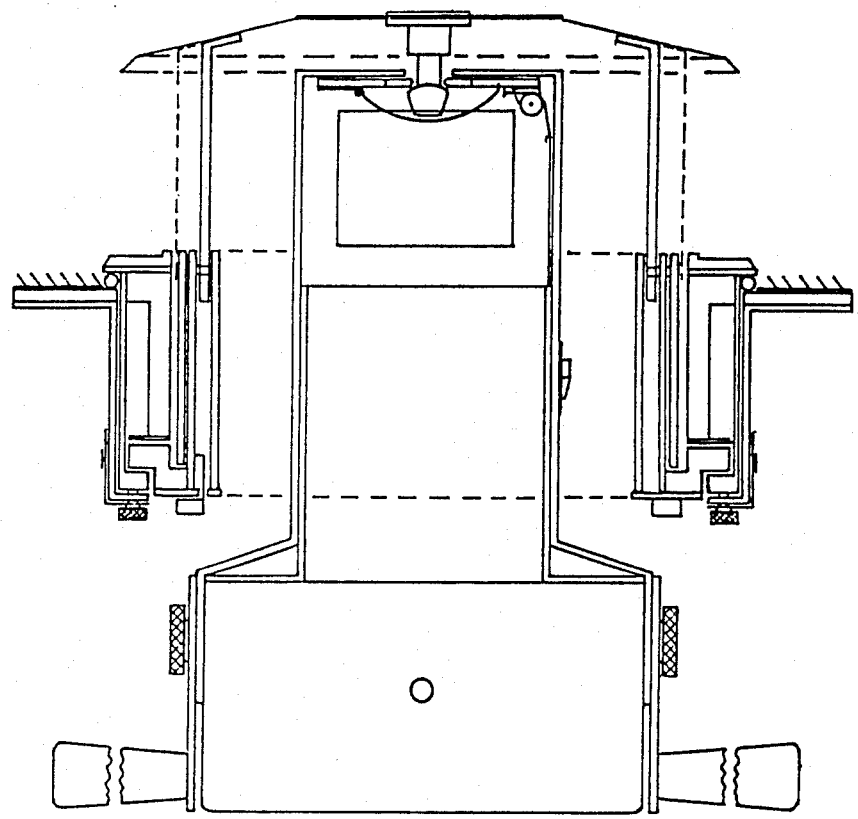
Figure 3:
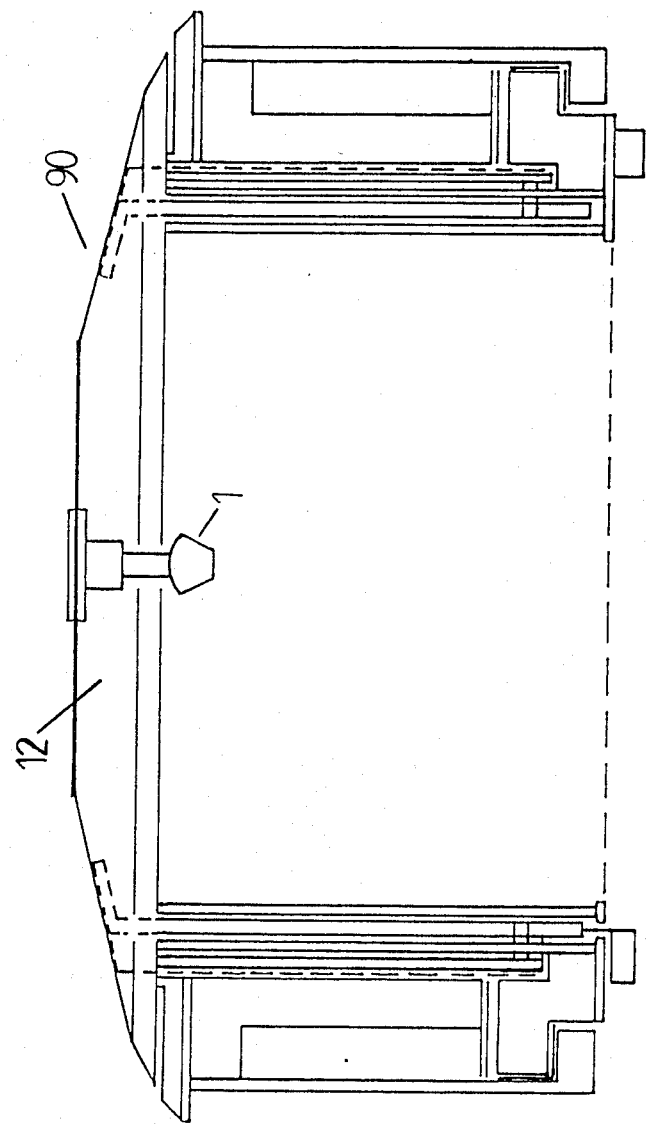
Figure 4:
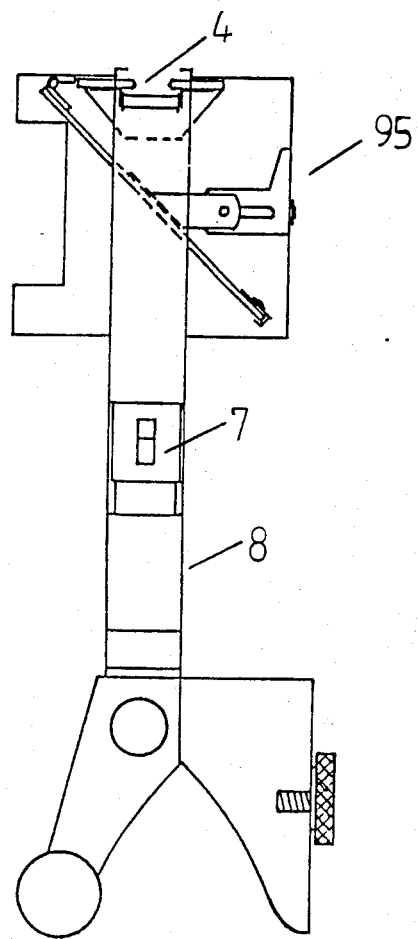
Figure 7:
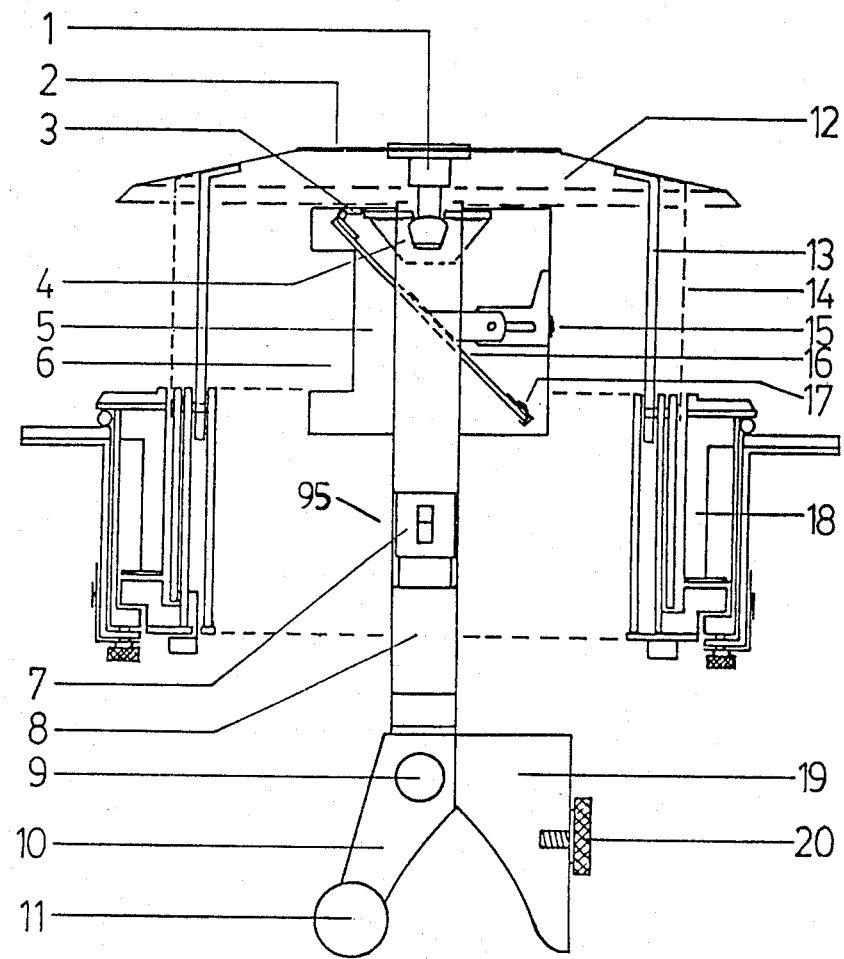
Figure 8:
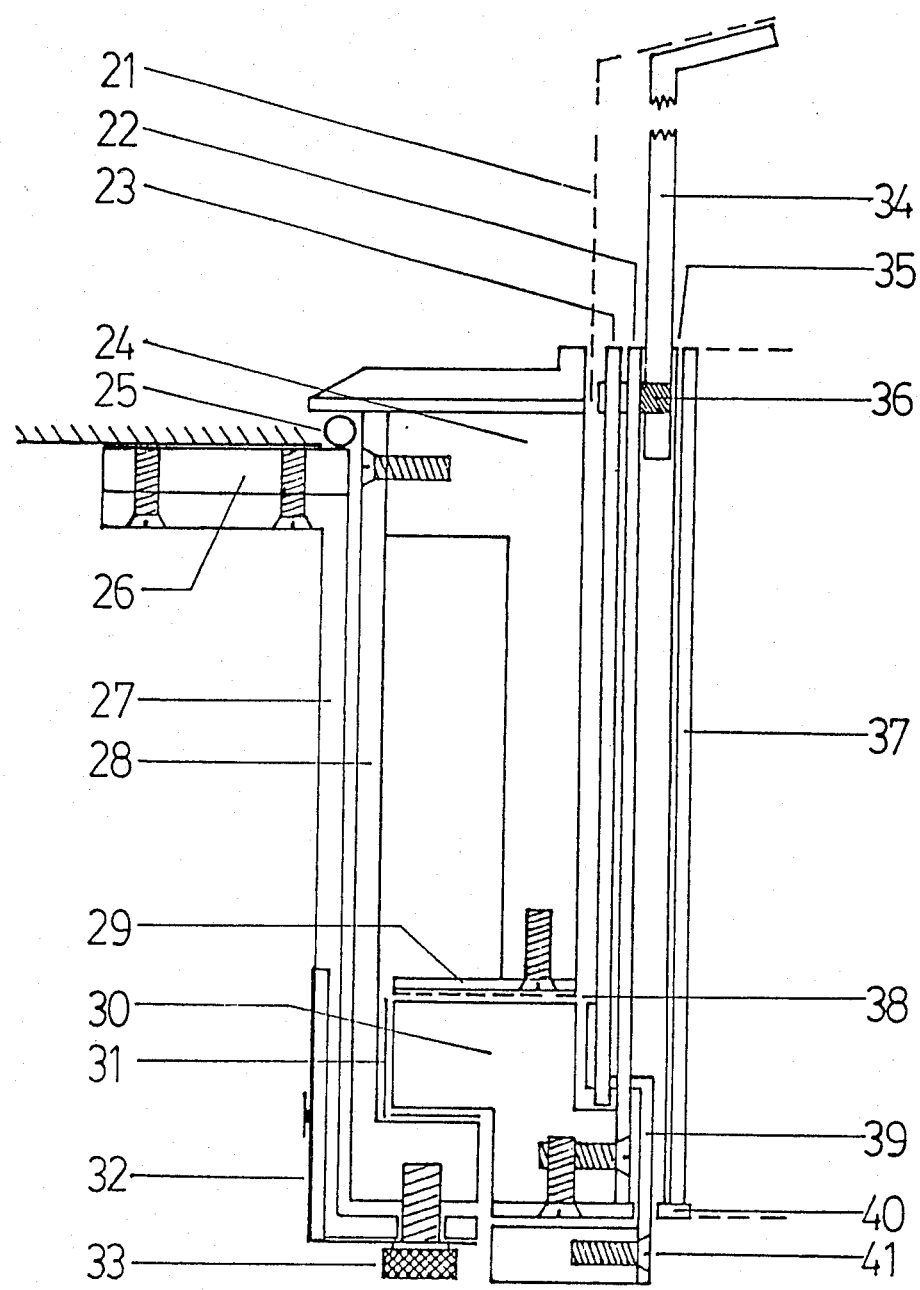
Figure 12:
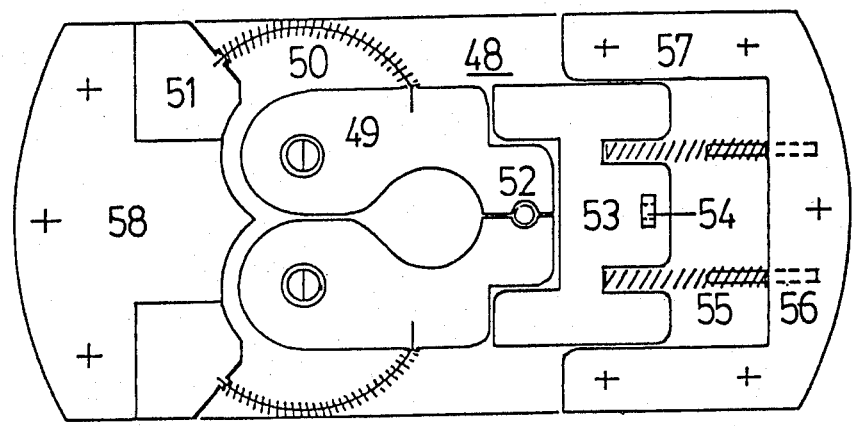
Figure 13:
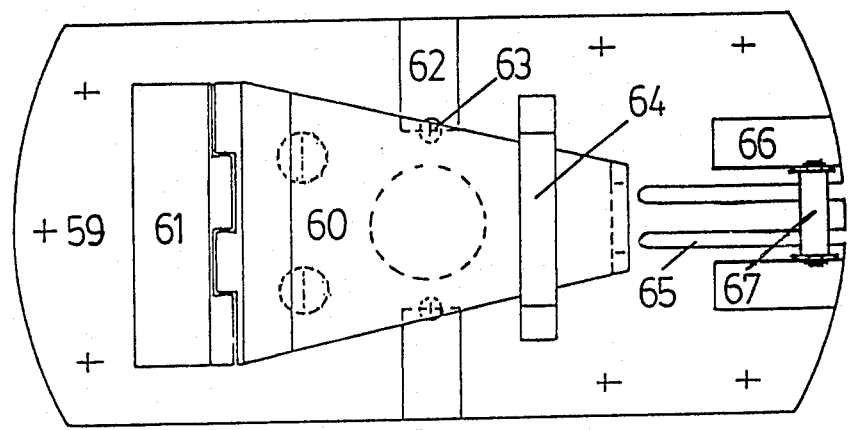
Figure 14:
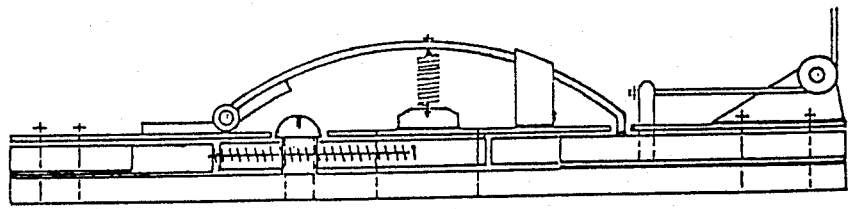

By way of example, a preferred embodiment of the present invention will now be described with reference to the accompanying drawings in which:

FIG. 1 is a schematic and part cross-sectional elevational view of the camera mounting system of the preferred embodiment with the cap portion in its retracted position, FIG. 2 is a schematic and part cross-sectional elevational view of the camera mounting system with the cap portion in its extended position, FIG. 3 is a schematic cross-sectional view of the dome unit of the preferred embodiment, FIG. 4 is a side elevational view of the camera mount bracket of the preferred embodiment, FIG. 5 is a schematic cross-sectional view of a ring cap cover for use with the preferred embodiment, FIG. 6 is a cross-sectional view of the mounting bracket member of the preferred embodiment, FIG. 7 is a schematic and part cross-sectional side elevational view of the mounting bracket member of FIG. 6 supporting the dome unit of FIG. 3 with camera mount bracket of FIG. 4 attached, FIG. 8 is a schematic cross-sectional view of part of the dome unit of FIG. 3 installed in the mounting bracket member of FIG. 6, FIG. 9 is a perspective view of part of the vertical guide cylinder and outer locking cylinder, FIG. 10 is a perspective view of part of the vertical guide cylinder of FIG. 9, FIG. 11 is a perspective view of part of the outer locking cylinder of FIG. 9, FIG. 12 is a plan view of the base plate and components of the ball catch assembly FIG. 13 is a plan view of the cover plate and components of the ball catch assembly, and FIG. 14 is a schematic and part cross-sectional elevational view of the ball catch assembly.

The system of the preferred embodiment comprises four basic units; a dome unit 90 as illustrated in FIG. 3, a camera mounting bracket 95 as illustrated in FIG. 4, frame support means such as a roof mounting ring 26 as illustrated in FIG. 6, and a roof mounting ring cap 80 as illustrated in FIG. 5.

To install the system, a hole of predetermined size is cut in the vehicle roof and suitably drilled. The roof mounting ring 26 (FIG. 6) is then fitted to the inside of the vehicle roof by means of sealed rivets.

The dome unit 90 with its rotary center section, is lowered into the roof mounting ring 26 (FIG. 6) from above the vehicle roof, and held down by brackets and knurled screws 33.

The camera mounting bracket (FIG. 4) is fitted to the dome unit by means of a ball member 1 fitted in the center of the dome cap 12 and a ball catch assembly 4 mounted at the top of the camera mounting bracket. By moving down a ball catch slide 7, located on the camera mounting bracket side frame 8, the ball catch assembly 4 is unlocked and remains unlocked until the ball 1 enters the catch assembly 4 and automatically releases and locks the catch assembly to the ball, which secures the camera mounting bracket 95 to the dome unit 90.

FIG. 1 shows the complete unit with the dome unit 90 of FIG. 3 installed in the roof mounting ring 26 of FIG. 6 with the camera mounting bracket 95 of FIG. 4 attached. The system in FIG. 1, is in its retracted (down and locked) position.

The center of the dome unit 90 and camera mounting bracket 95, are raised by a short rotary movement of a locking up and down control bracket, located at the base of the dome unit 90, and by applying an upward hand pressure at the base of the camera mounting bracket 95. The center section of the dome unit 90 and camera mounting bracket 95 are extended (raised and locked in the up position) as shown in FIG. 2. The camera mounting bracket 95, through the service of an angle set surface coated mirror 16, has full rotary traverse with up and down angles of view and gives the camera operator a much improved photographic field of view.

To lower the raised (telescoping) section of the dome unit 90 and camera mounting bracket 95, a short rotary movement of the locking up and down control bracket, located at the base of the dome unit, releases the locked up condition, and the raised section of the dome unit 90 and the camera mounting bracket 95 are lowered to the down and locked position as in FIG. 1.

The camera mounting bracket 95 is released from the dome unit by moving down the ball catch slide 7, located on the camera mounting bracket side frame 8, which unlocks the ball catch assembly 4 and releases the ball 1.

When the vehicle is not used for surveillance photography, the dome unit 90 may be removed from the roof mounting ring 26 and a ring cap 80, shown in FIG. 5, fitted.

Specific components of the basic units of the preferred embodiment will now be described with particular reference to FIGS. 5 to 14:

THE DOME UNIT

The basic components of the dome unit (see FIG. 8) are an upper support casting (24), a rotary support casting (28), a rotary casting (30), and a dome cap (12).

The upper support casting 24 has a flange around the top thereof to support the complete unit when fitted to the roof mounting ring 26. Fitted between this flange and the roof mounting ring is "O" ring rubber weather seal 25. Attached to the base of this casting is a thrust plate 29 covered with sheet felt 38.

Fitted to this upper support casting by screws is the rotary support casting 28. This casting has four holes drilled and tapped at 90 degrees intervals at its base, to receive knurled holding down screws 33. Castings 24 and 28 form the outer structure of the dome unit 90.

The rotary casting 30 is supported by the rotary support casting 28, between which is interposed flat plastic sheets 31 to minimise rotary friction. Fitted to the inner surface of this rotary casting is a vertical guide cylinder 22. This vertical guide cylinder has at 90 degree intervals a vertical slot 46. Fitted to each of these four slots 46 is a dome raising bracket guide 35 and dome raising bracket 34. These brackets are fitted to the dome cap 12. Screwed into each dome raising bracket is a locking up and down stud 36.

Fitted around the vertical guide cylinder 22 is an outer locking cylinder 23 with "C" section slots 42 cut at 90 degree intervals. It is the combination of these four "C" section slots 42, dome raising brackets 34 and locking up and down studs 36 that effect the raising, lowering and locking of the dome cap 12. Attached to the base of the outer locking cylinder 23 is a locking cylinder control bracket 39 and control bracket knob 41. This bracket 39 is the means of controlling the locking action of the outer locking cylinder 23.

Fitted to the dome cap 12 and interposed between upper support casting 24 and outer locking cylinder 23 is the dome mesh 21. The mesh 21 can have a sliding aperture for use at night with low light amplification. The dome cap 12 has a reinforced section 2 at its top to reinforce the ball mounting. Inside the vertical guide cylinder 22 is a dress cylinder 37. The base of this dress cylinder rests on a base plate 40 screwed to the rotary casting 30.

When the dome unit 90 with camera mounting bracket 95 attached, is in the down and locked position, the up and down locking studs 36 are at rest in the lower horizontal arms of the "C" section slots 42 in the outer locking cylinder 23.

A rotary movement of approximately ten degrees of the locking cylinder control bracket 39 moves the outer locking cylinder 23 ten degrees also. This action moves the horizontal section of the "C" section slots 42 ten degrees and frees the locking studs 36 from that arm of the "C" section slots and aligns the vertical branch of these "C" section slots with the vertical slots 46 cut in the vertical guide cylinder 22. The locking studs 36 fitted to the dome raising brackets 34 are now free to move in a vertical direction.

By applying upward hand pressure at the base of the camera mounting bracket 95, the dome raising brackets 34 are raised. The studs 36 fitted to the dome raising brackets move to the top of the vertical section of the "C" section slots 42.

A reverse movement of the locking cylinder control bracket 39 of approximately ten degrees brings the locking studs 36 to rest in the top horizontal arm of these "C" section slots 42 thus locking the dome cap and camera mounting bracket in the up position, as in FIG. 2.

The rotary center section fitted to the rotary casting 30 of the dome unit has unlimited horizontal rotation when the dome cap 12 and camera mounting bracket 95 are in the up and locked position. This is to allow the operator to rotate this section of the dome unit to remove the dome raising brackets 34 from the angle of view of the lens.

CAMERA MOUNTING BRACKET

The camera mounting bracket 95 has an upper frame with a lower support frame 8. Attached to the inside top of the upper frame is a mirror housing 5 with mirror aperture cutout 6. This cutout is to accommodate the angle of view of the lens used. Fitted inside this housing at its top is a ball catch assembly 4 for mounting the camera mounting bracket 95 to the dome cap ball 1. This ball catch assembly is activated by a locking slide 7 connected to the catch assembly and situated on the mounting bracket side frame 8. This locking slide 7 unlocks the ball catch assembly 4 and the catch remains unlocked until the entry of the dome cap ball 1 which automatically trips the mechanism and locks it to the ball.

The ball catch assembly 4 has a base plate 48 having two pivoting jaws 49 with return springs 50 and return spring guides 51. Between the free end of the jaws 49 there is an anti-recoil post 52. A slide locking piece 53 has two return springs 55 and return spring guides 56. Fitted to the slide locking piece 53 is the slide locking piece anchor post 54. This anchor post is fitted to a locking slide pull cord. A slide locking piece guide 57 serves also as spacer, and another spacer 58 is also fitted.

The ball catch assembly 4 also has a cover plate 59 having a slide lock release 60 with hinge 61. This release is kept in contact with the slide locking piece 53 by two spring 63 attached to retaining brackets 62. Movement of this slide-locking release 60 is restricted by bracket 64. Two slots 65 are cut in cover plate 59 to allow movement of slide locking piece anchor 54, which permits horizontal movement of slide locking piece 53. A pull cord roller 67 supported by brackets 66 is fitted to cover the plate.

When the locking slide 7 connected to the slide locking piece anchor post 54 is retracted, the slide locking piece 53 is moved back against its return springs 55 releasing the ball locking jaws 49. When the slide locking 53 is at its full traverse the slide-lock release 60 through the service of its tension spring 63, drops and locks the slide locking piece in that position. The ball locking jaws 49 are now free to move outward against their return springs 50. The catch assembly is now in a condition to receive the dome cap ball 1. The said ball 1 enters between the ball locking jaws 49 forcing them outwards against their return springs 50.

As the ball 1 passes through the jaws 49 they snap together behind the ball 1 and come to rest against the anti-recoil post 52. As the ball passes beyond the jaws it contacts the slide-lock release 60. The slide-lock release 60 is then disengaged from the slide locking piece 53 which is forced forward by its return springs 55 to lock together the free ends of the ball locking jaws 49. As the slide locking piece 53 is forced forward, the locking slide 7 on the camera mounting bracket side frame 8 is returned to its normal position. The ball catch assembly and camera mounting bracket 95 are now locked to the dome cap ball 1 as in FIG. 1. A side elevational view of the complete ball catch assembly in locked condition as described above is shown in FIG. 14.

A surface coated mirror 16 and mirror mounting plate 17 are mounted in the mirror housing. The mirror mounting plate 17 has two adjustments, a plate hinge base adjustment 3 for horizontal adjustment, and mirror angle adjuster 15 for vertical angle adjustment. The base of the camera mounting bracket 95 is fitted to a camera or lens mounting base 19, with hole and knurled screw 20 for this purpose. Fitted to the side frame of the mounting bracket and camera mounting base are control handle brackets 10 with knurled mounting screws 9 and handle grips 11. These control handle brackets and control handle grips are to direct and control the movement of the camera mounting bracket when fitted to the dome cap ball 1.

ROOF MOUNTING RING

The roof mounting ring 26 has twenty-four clearance holes drilled for fitting to the vehicle roof. Attached to this mounting ring are four angle brackets 27 at 90 degree intervals, with knurled screw retainers 32 and knurled screws 33. These brackets and knurled screws align with holes drilled and tapped in the base of the rotary support casting 28 of the dome unit 90.

ROOF MOUNTING RING CAP

A ring cap 80 is used in the roof mounting ring 26 when the dome unit 90 has been removed. The cap 80 has four locking down slide catches 70 with a circular sponge rubber weather seal 69. At the center of this ring cap 80 is a pull down knob 71 to assist in the operation of the slide catches.

When the dome unit 90 has been removed from its fitment in the roof mounting ring 26 the roof mounting ring cap 80 with its four locking down slide catches 70 fully retracted, can be fitted into the said mounting ring 26 from above the vehicle roof. Whilst a downward pressure is exerted on the pull down knob 71 to compress the sponge rubber weather seal 69, the four locking down slides 70, are moved individually in an outward direction to their maximum travel fitting under the vehicle side of the mounting ring 26. The roof mounting ring cap 80 is now effectively locked to the roof mounting ring 26.

The foregoing describes only one embodiment of the present invention; and modifications, obvious to those skilled in the art, may be made thereto without departing from the scope of the present invention as claimed in the following claims.

What I claim is:

1. A camera mounting system comprising frame support means adapted to be affixed adjacent an opening in the roof of a vehicle or the like; a mounting assembly receivable in said opening and supported by said frame support means, said assembly having a telescoping cap portion extendable from a retracted position wherein the cap portion covers said opening to an extended position outwardly of said opening; a camera mount bracket releasably attachable to said cap portion from within said mounting assembly, said camera mount bracket comprising a mirror adjusted to reflect light from outside said opening to a camera positioned inside on said camera mount bracket, said camera mount bracket being rotatable within said opening.

2. A system as claimed in claim 1, wherein said mounting assembly is a dome unit having a generally cylindrical frame surmounted by said cap portion.

3. A system as claimed in claim 2, wherein said dome unit comprises a tubular screen mesh depending downwardly from said cap portion and coaxial with said frame, wherein said screen mesh covers the area between said cap portion and said opening when said cap portion is in its extended position, and retracts within said mounting assembly when said cap portion is in its retracted position.

4. A system as claimed in claim 3, wherein said screen mesh has an aperture therein and said cap portion is rotatable with respect to said opening.

5. A system as claimed in claim 1, wherein said camera mount bracket is attached to said cap portion by a ball catch assembly.

6. A system as claimed in claim 5, wherein said ball catch assembly is operable by a slide mechanism on the side of said camera mount bracket.

7. A system as claimed in claim 2, wherein the cap portion has a plurality of legs depending downwardly therefrom and telescoping within guideways connected to said frame, said system further comprising means for locking said legs in said guideways at positions corresponding to said retracted and extended positions of said cap portion.

8. A system as claimed in claim 7, wherein said locking means comprises a lug on each of said legs received in a respective C-shaped slot, whereby the cap portion is locked in its retracted and extended positions when the lugs are in the bottom and top arms of said slots, respectively.

9. A system as claimed in claim 1, wherein said camera mounting bracket comprises a variable position mount for holding said mirror.

10. A system as claimed in claim 1, further comprising a separate cover for covering said opening when said assembly is removed therefrom.

* * * * *